Aug. 11, 1936.  F. X. MALOCSAY  2,050,710
WRAPPING MACHINE
Filed Nov. 29, 1930  17 Sheets-Sheet 2

INVENTOR
Francis X. Malocsay
BY Schechter Lotsch
his ATTORNEYS

Aug. 11, 1936.  F. X. MALOCSAY  2,050,710
WRAPPING MACHINE
Filed Nov. 29, 1930   17 Sheets-Sheet 5

INVENTOR
Francis X. Malocsay
BY
his ATTORNEYS

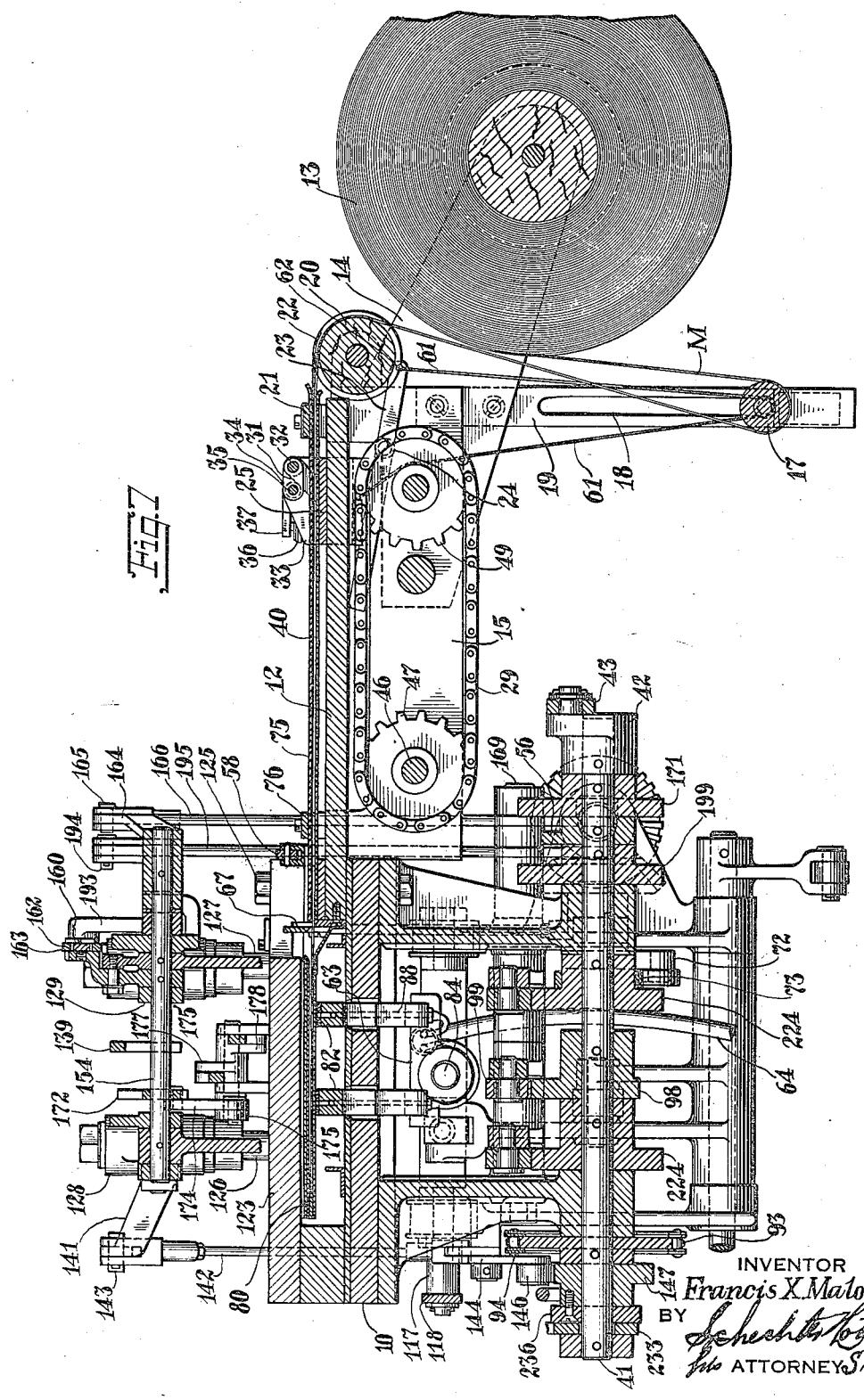

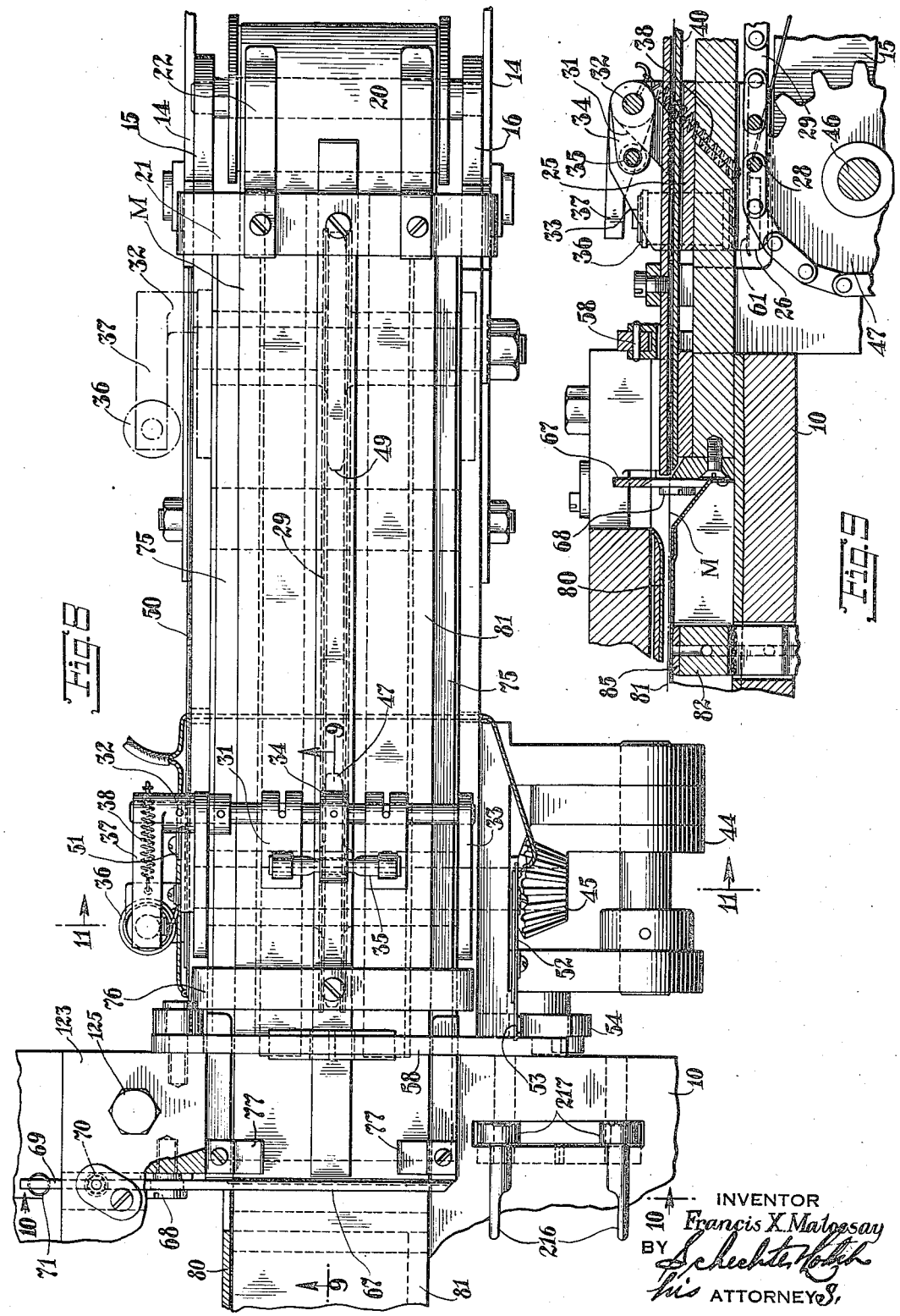

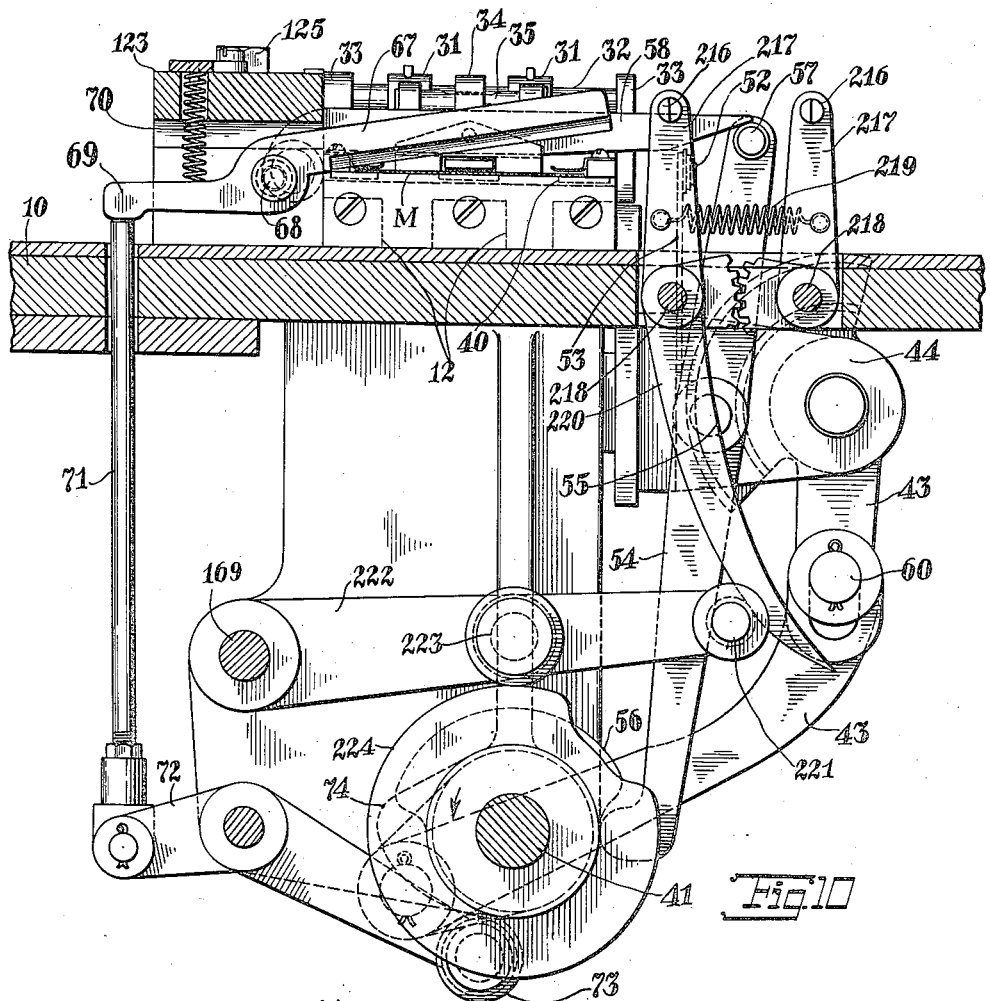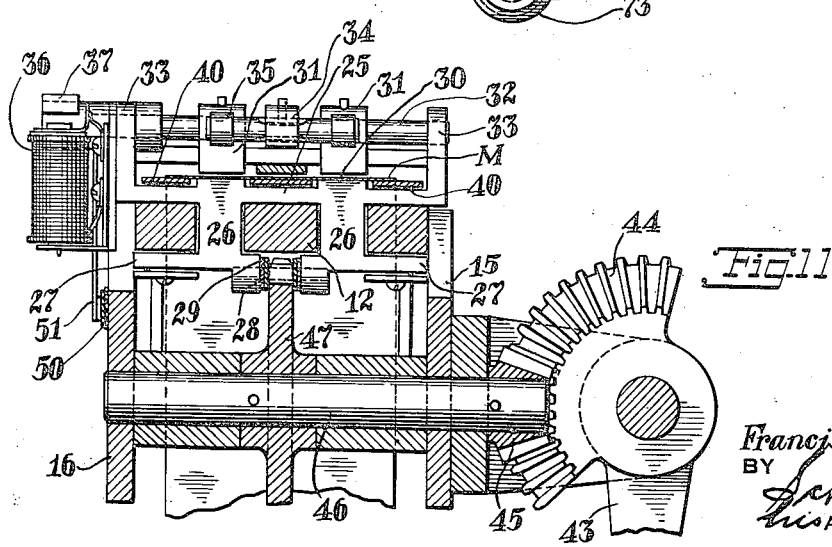

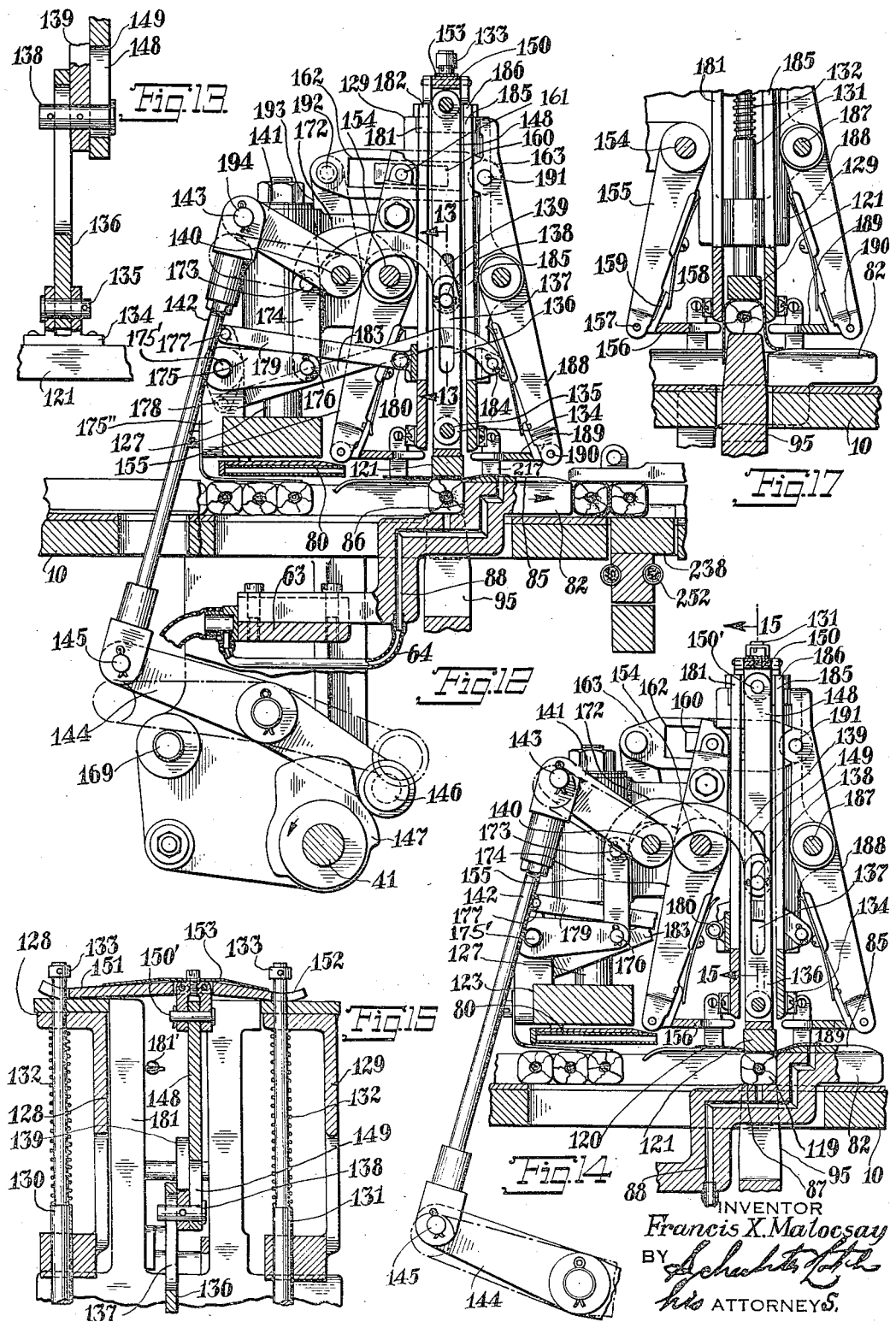

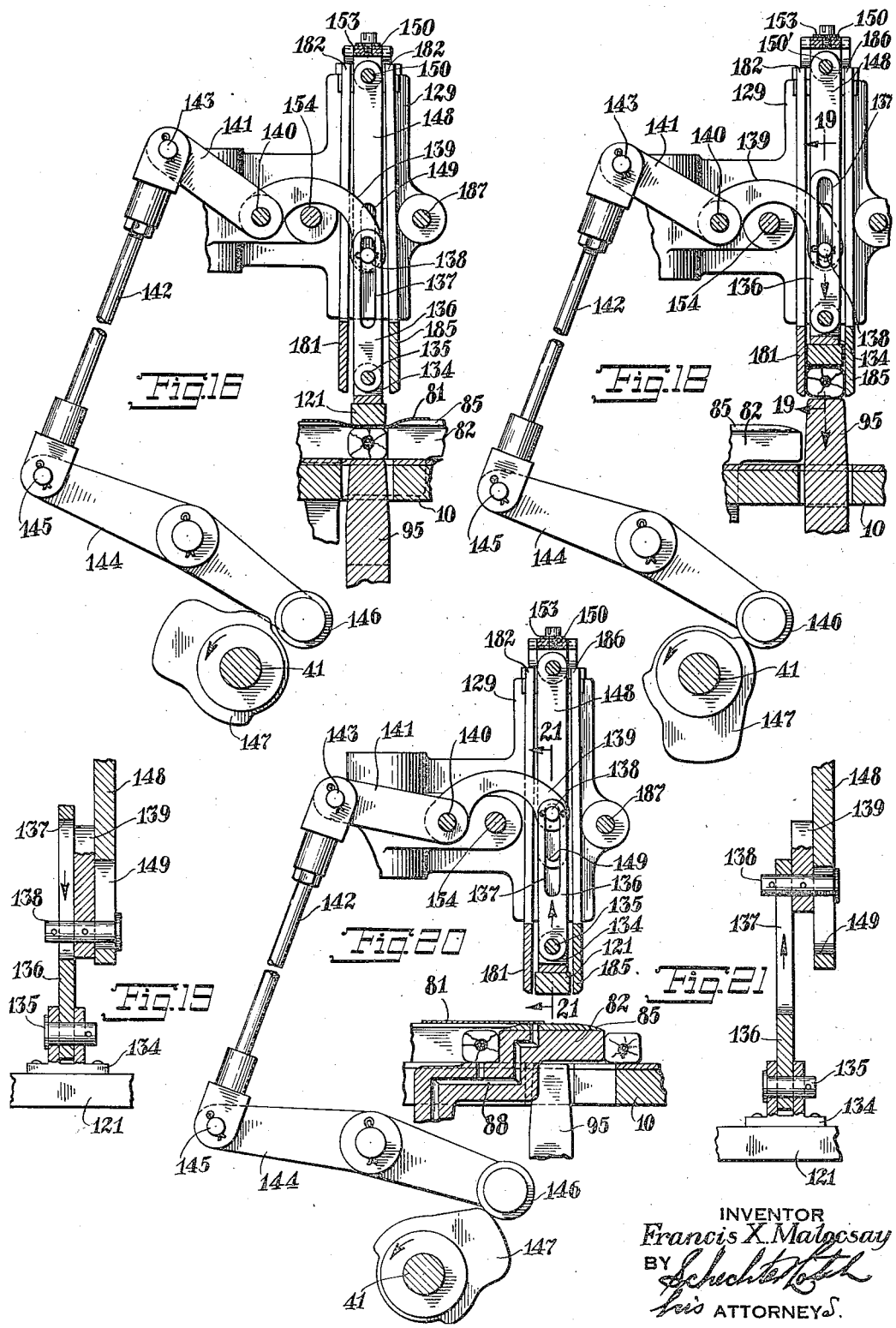

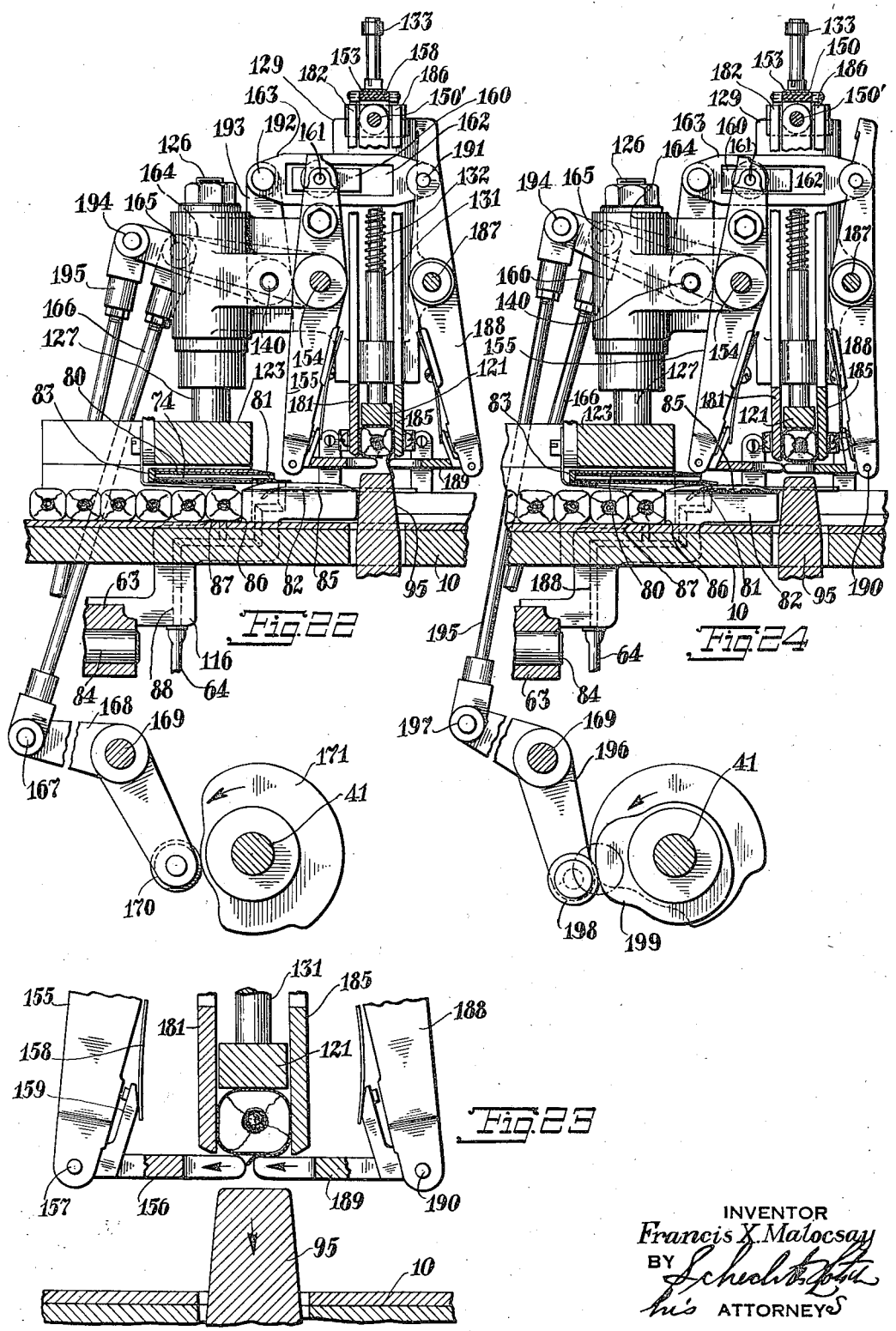

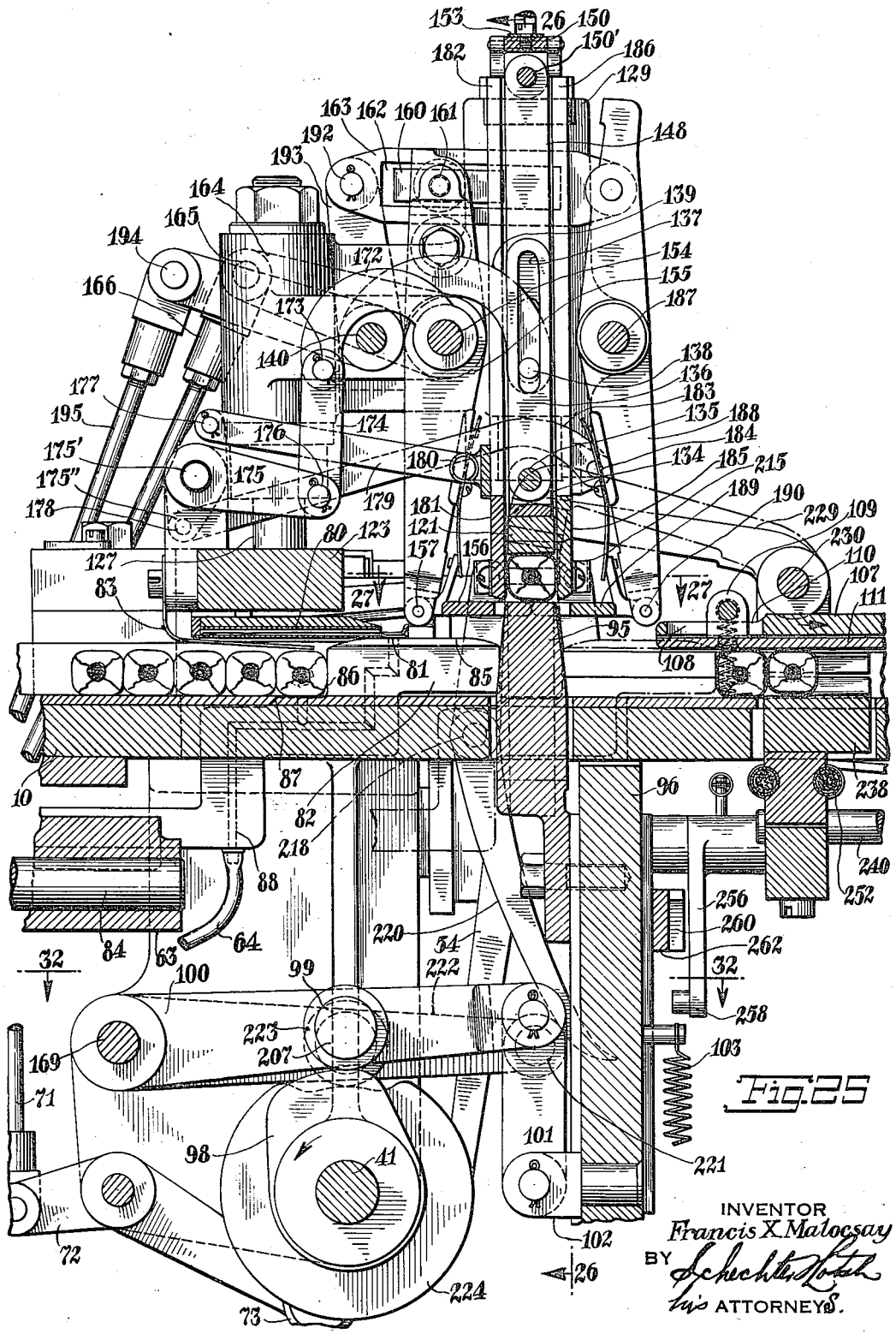

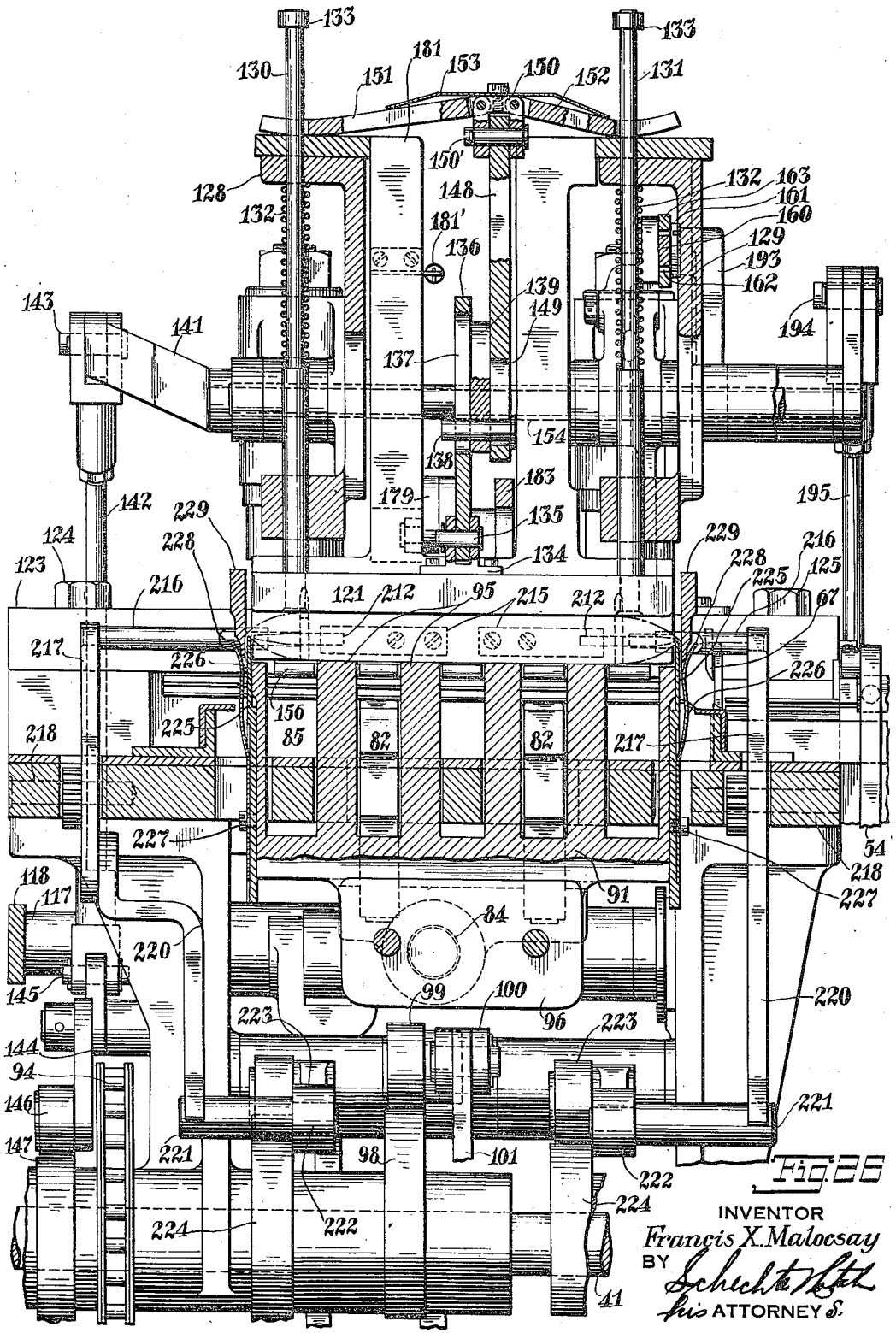

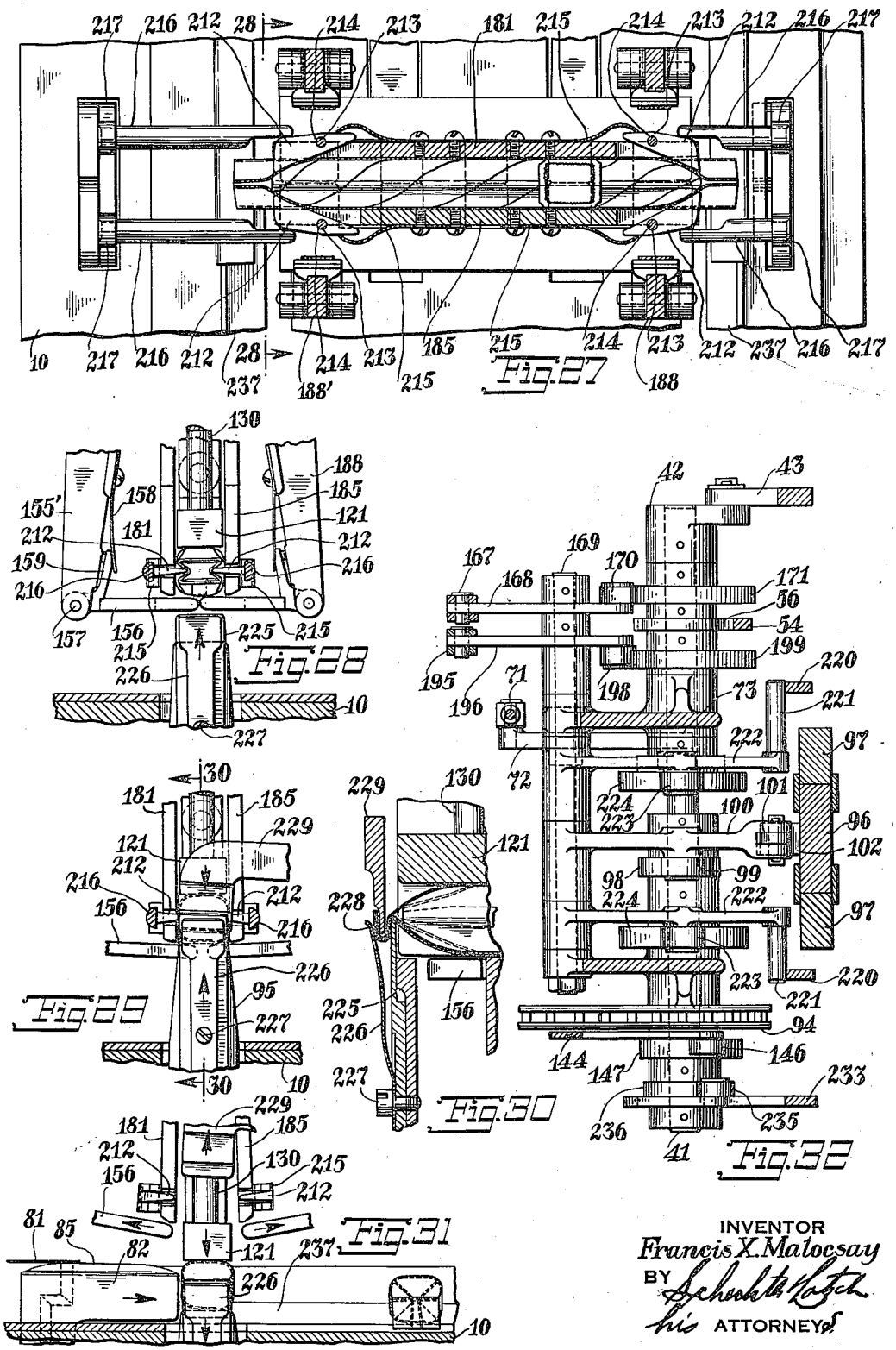

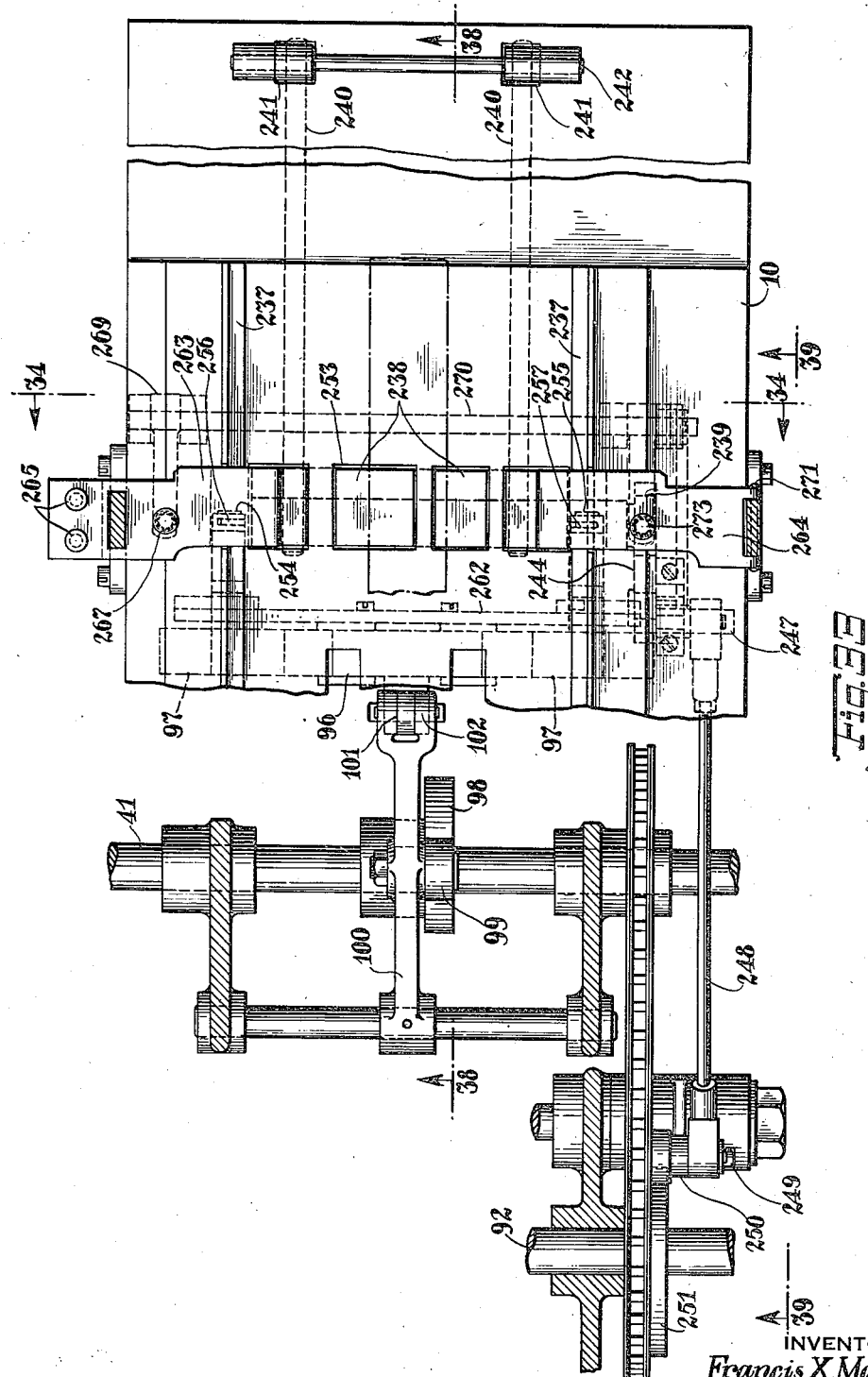

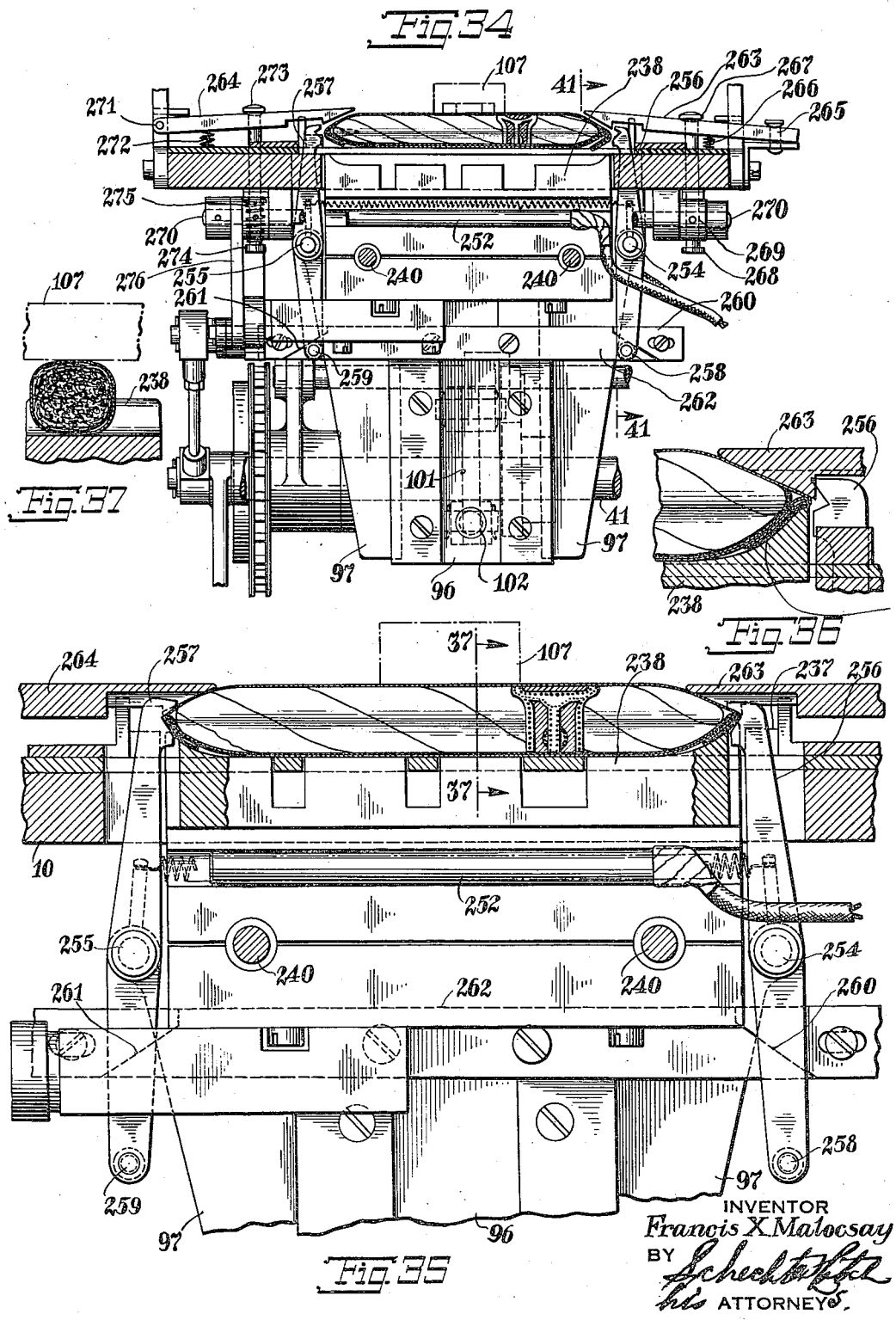

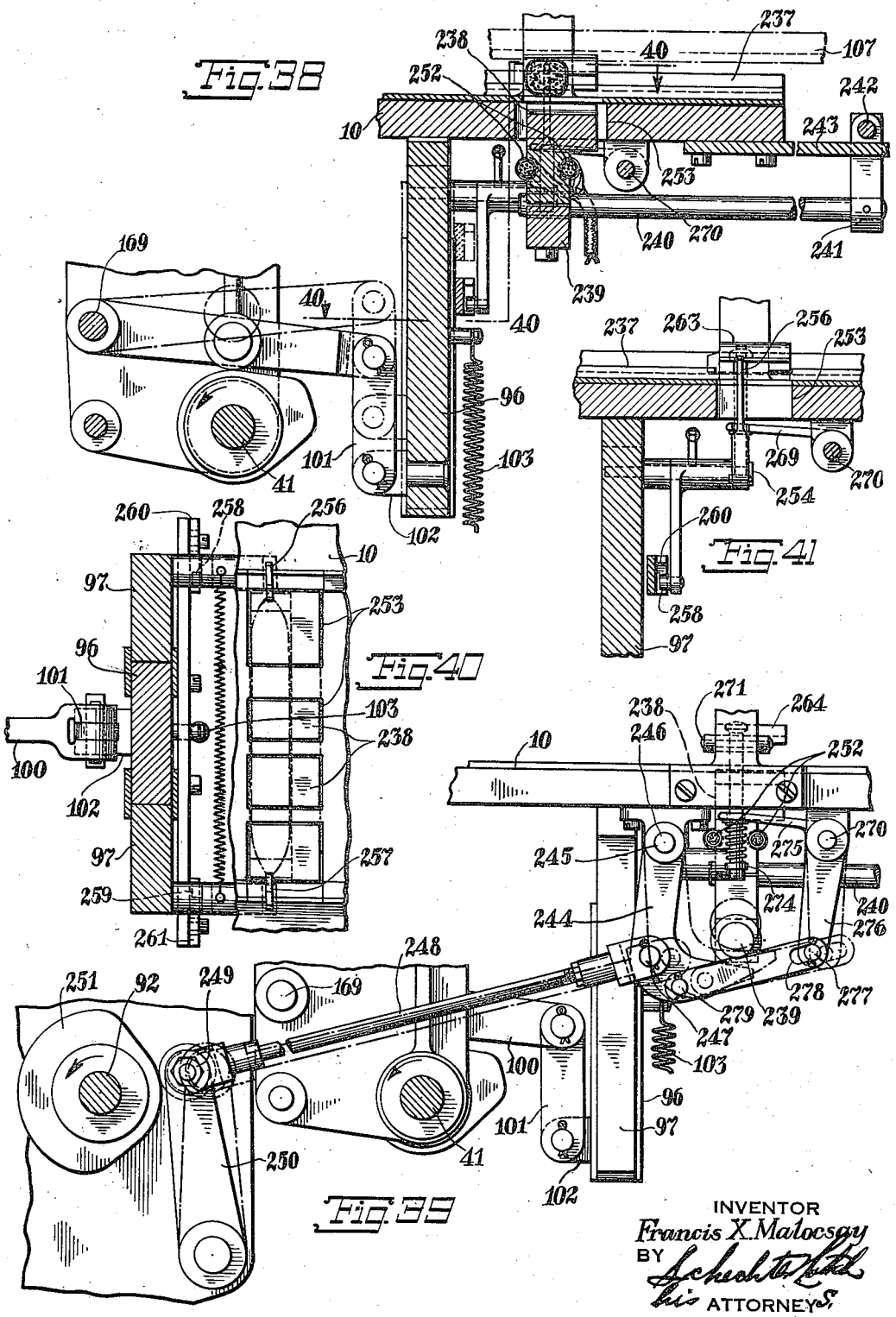

Patented Aug. 11, 1936

2,050,710

UNITED STATES PATENT OFFICE 2,050,710

WRAPPING MACHINE

Francis X. Malocsay, Upper Saddle River, N. J., assignor, by mesne assignments, to Consolidated International Corporation, a corporation of New York Application November 29, 1930, Serial No. 498,992

20 Claims. (Cl. 93—2)

This invention relates to article wrapping machines and while broadly applicable, is particularly concerned with the wrapping of cigars in cellophane paper.

It is among the objects of the present invention to provide an article wrapping machine which will automatically carry on the entire wrapping operation including the feeding of articles, the application of wrapping material, the tucking or folding of the material about the article and the discharge of the wrapped article.

Another object is to provide a "Cellophane" wrapping machine adapted to heat the "Cellophane" and thus by a simple pressing operation seal the material by simple adhesion between portions thereof and without the use of a gluing or sealing material.

Another object is to provide a wrapping machine including means for supplying from a continuous roll supply of wrapping material, individual wrapping sheets of proper dimensions, and as required by the rate of article feed.

Another object is to provide a wrapping machine particularly adapted for cooperation with a conventional cigar banding machine so that it may be formed as a portion thereof, may be actuated thereby and therewith, and may partake of automatic control thereof.

Another object is to provide a wholly cooperated device coordinated with a banding machine for synchronous operation therewith so that its wrapping operation will be timed to accommodate the entire output of a banding machine.

Another object is to provide a wrapping machine which in itself is coordinated and synchronized so that article feed, wrapper supply and folding operation all follow in cooperative timed sequences to the end that the various operations follow in automatic sequence and the machine functions as a unit.

Another object of the invention is to provide a wholly coordinated and combined assembly by which the foregoing objects are carried out in a novel simple and improved manner and thereby increase the production and reduce the cost of wrapping the cigar.

Another important object is to provide a wrapping machine in which the entire operation is automatic and does not require the human handling of the articles and which thus greatly reduces the amount of manual labor or supervision required.

A further object of the invention is to provide a machine adapted to be used as an attachment to or in connection with banding machines such as, for example, that illustrated in my Patent No. 1,261,832, dated April 9th, 1918, in my copending application on Cigar banding machines, Serial No. 37,464, filed June 16, 1925, or in my more recent application on Cigar banding machines, Serial No. 492,437, filed October 31, 1930.

In this specification no detailed description of the operation of the banding machine will be made, but reference may be had to my patent and copending applications aforesaid for a more complete disclosure of the operation of such banding machine.

Other more specific objects and advantages of the apparatus will appear as the nature of the improvements is better understood, the invention consisting substantially in the novel arrangement and corelation of instrumentalities herein fully described and illustrated in the accompanying drawings wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive, standpoint. It will be understood that the various features of the invention may be separately applicable despite their cooperation herein shown.

While the above statements set forth a few of the more general objects of the invention, it will be understood that the invention concerns itself with other objects and advantages too numerous to mention relating to structural detail and interrelation and cooperation of parts, by means of which the advantageous functions are achieved, a major object being to provide an efficient, rugged, durable, simple and automatic machine particularly adapted to meet the demands of economic manufacture and operation.

In the preferred embodiment of the device, the invention preferably consists of a table arranged as an extension of a cigar banding machine table. A wrapping paper roll holder is mounted with the table and a paper moving carriage, preferably operated by the banding machine drive, periodically delivers individual sheets cut from the roll to the wrapping mechanism per se. This mechanism utilizes suction means in a part of its operation and provides a cigar moving means coordinated with the paper supply so that the paper is laid over the cigar. The folding is accomplished by the joint movement of the cigar and paper and certain folding arms. Heating means may be applied with parts of the structure to self-seal wrapping paper of the heat responsive type such as "Cellophane". All of the moving parts of the assembly are operated either directly or indirectly from a single drive shaft which is particularly adapted for driving connection with a banding machine, the structure of which forms no part of the present invention. In addition to many unique and improved structural combinations and interrelations, the invention is broadly directed to the composite assembly and cooperative drive of parts by which a proper sequence of operation is maintained and a wholly automatic continuously operating device results.

It will be understood that while the invention is illustratively disclosed as a cigar wrapping machine for conjoint operation by and with a banding machine and embodying specific novel combinations, the invention is in no wise limited to the use or structure here shown, and thus numerous changes, modifications and the full use of equivalents may be resorted to without departing from the spirit or scope of the invention.

The inventive idea involved is capable of receiving a variety of mechanical expressions, one of which for the purpose of illustration is shown in the drawings.

The invention may be more fully understood from the following description in connection with the accompanying drawings, wherein—

Fig. 7 is a sectional view taken on line 7 of Fig. 2;

Fig. 8 is a detail plan view of the paper supply mechanism;

Fig. 9 is a section taken on line 9 of Fig. 8;

Fig. 10 is a section taken on line 10 of Fig. 8;

Fig. 11 is a section taken on line 11 of Fig. 8;

Fig. 12 is a sectional view taken on line 12 of Fig. 2;

Fig. 13 is a detail section taken on line 13 of Fig. 12;

Fig. 14 is a view similar to Fig. 12 showing the parts in slightly different position;

Fig. 15 is a sectional view taken on line 15 of Fig. 14;

Fig. 16 is a detail section similar to Figs. 12 and 14 showing the first step in the wrapping;

Fig. 17 shows the second step;

Fig. 18 shows a further position of parts in the wrapping operation;

Fig. 19 is a sectional view taken on line 19 of Fig. 18;

Fig. 20 shows the relation of parts just prior to the wrapping;

Fig. 21 is a section taken on line 21 of Fig. 20;

Figs. 22, 23 and 24 are consecutive views showing the movement of the folding arms;

Fig. 25 is a section taken on line 25 of Fig. 2;

Fig. 26 is a section taken on line 26 of Fig. 25;

Fig. 27 is a section taken on line 27 of Fig. 25;

Fig. 28 is a section taken on line 28 of Fig. 27;

Fig. 29 is a similar section showing a subsequent position of parts;

Fig. 30 is a detail section showing the folding action taken on line 30 of Fig. 29;

Fig. 31 is a section similar to Figs. 28 and 29 showing the final movement of the wrapping arms;

Fig. 32 is a section taken on line 32 of Fig. 25;

Fig. 33 is a section looking down upon the table as indicated by the line 33 of Fig. 1;

Fig. 34 is a section taken on line 34 of Fig. 33;

Fig. 35 is a similar section showing the parts in a more advanced position;

Fig. 36 is a detail view of the sealing action;

Fig. 37 is a section taken on line 37 of Fig. 35;

Fig. 38 is a section taken on line 38 of Fig. 33;

Fig. 39 is a view taken on line 39 of Fig. 33;

Fig. 40 is a section on line 40 of Fig. 38;

Fig. 41 is a section on line 41 of Fig. 34.

Figure 1:
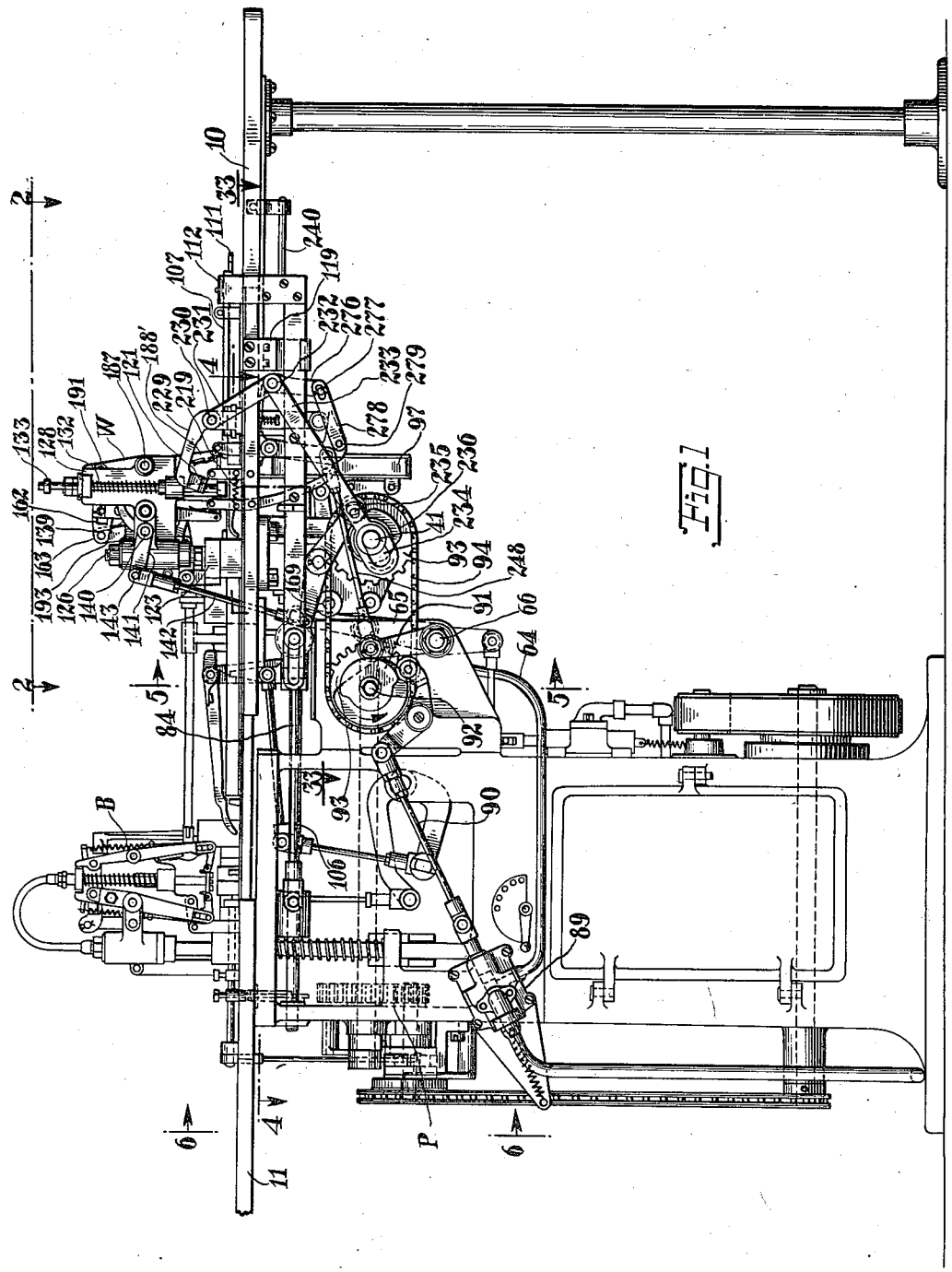
Fig. 1 is a front elevation of the invention in combination with a cigar banding machine.

The preferred structural embodiment of the invention includes a table 10 which may preferably be formed, as here illustrated, as a longitudinal extension of the table 11 of a conventional cigar banding machine. Extending at right angles from the table 10 is a wrapping material supply assembly generally indicated at S in Fig. 2. At the junction of the assembly S and the table 10, there is mounted a wrapper assembly generally indicated at W. Both the wrapper assembly and the wrapping feed assembly are coordinately operated through driving means hereinafter described in detail and indicated generally in Fig. 1. The driving means is preferably connected with the banding power mechanism P so that wrapping operation may be coordinated with banding operation. (See Fig. 1.) The banding assembly is shown at B and cigars are fed to the wrapper partly by their discharge from the banding assembly. While the invention is shown in connection with a banding machine of improved modern design, it is obvious that it is in nowise limited to such combination and is in its broader aspects adapted for individual article wrapping use or in combination with various other devices. The invention is not concerned with nor limited to the combination illustrated.

*Wrapping material feed*

The "Cellophane" or other wrapping material feed assembly S is best shown in Figs. 2 to 11 and consists of a table extending at right angles from the table 10 and the mounting thereon of the assembly W. The table is formed of three parallel rails 12 (see Fig. 11) to which the material is supplied from a roll or similar material supply 13. The roll is supported by brackets 14 which are carried by side frames 15 and 16 of the table rails 12. As shown clearly in Fig. 7, the material M from the roll 13 preferably passes downwardly under a tension roller 17 which is mounted for free vertical gravitational movement in slots 18 of supporting arms 19 depending from the ends of frames 15 and 16. On the other side of the roller 17 the material M passes up over an end roller 20 supported by the frames and thence under a guiding transverse bar 21 carrying outwardly extending guiding fingers 22. Upon the roller 20 and from under the bar 21, the material passes to a material moving carriage which periodically carries the material forward to be cut and fed to the wrapper. The combination of roll 13 and rollers 17 and 20 will be seen to permit movement of the material, a pull thereon by the carriage acting to raise roller 17 and supply material at an even tension controlled by the weight of roller 17. This act may be by a feeding of material from roll 13 or not, but in any event no sudden pull and resulting spin of the roll 13 is evoked and a consequent smooth, even, yieldable tension is maintained on the material at all times.

A further aid in giving the proper tension on the material at all times is the lever 23 pivoted at 24 with the cord 61 attached at 62 passing around grooves on both sides of the roller 17 and clamped at the upper end to the chain 29. As the chain 29 pulls the cords 61 forward, the roller 17 raises at an even rate of speed thereby limiting the amount of material that can be fed.

For periodically moving the material forward towards the wrapper device W in response to requirement of material thereby, a carriage reciprocating upon the table rails 12 is utilized, which rests upon the rails 12 and lies under a conforming material supporting slotted plate 49. As shown in Figs. 7, 9 and 11 the carriage consists of a transverse bed 25 having a pair of depending lugs 26 which extend through the slots between the table rails 12 and carry under guide plates 27 which are united by a chain link 28 of a chain 29 by which the carriage is moved as hereinafter described. Opposite the lugs 26 supports 30, integral with them, extend upwardly through the slots of the bed 25 so as to be about flush with its top. These supports cooperate with gripper lugs 31 loosely mounted upon a transverse rock shaft 32 carried over the bed and supported through upwardly extending carriage side plates 33. Between the lugs 31, the shaft 32 has secured for movement therewith a gripper operating arm 34 which carries a cross bar 35, the ends of which rest upon the upper sides of the ends of the lugs 31. Thus upon movement of the shaft 32, the bar 35 presses down the lugs 31 to engage the material M against the supports 30, thus to move the material with the carriage. Reverse movement of the shaft will release the material to permit independent movement of the carriage. For controlling the shaft 32 to periodically hold or release the material, a simple electromagnet 36 is provided which is supported on one end of the side plates 33. Its pole, upon energization, attracts a keeper arm extension 37 of the shaft 32, the shaft being normally held up with the arm 34 by a spring 38. The electrical control of the magnet is coordinated with the carriage movement as will be hereinafter described.

The drive for the carriage (see Figs. 3, 5 and 11) is maintained from a main drive shaft 41, the end of which carries a crank 42 which oscillates a crank arm 43 through a lost motion joint 60 (see Fig. 10) of a segment gear 44. The gear 44 meshes with a bevel gear 45 carried upon a transverse shaft 46 supported in the side frames 15 and 16. Centrally of the shaft 46 a chain sprocket 47 is mounted over which a chain 29 operates, one of the links of which is the link 28. The opposite end of the chain 29 passes over a free sprocket 49. It will be observed that the arrangement is such that for each revolution of the shaft 41 its crank 42 gives the arm 43 a complete cycle of oscillation, which in turn first moves the shaft 46 in one direction and then back. In this cycle brief pauses at the dead center positions of the crank will result. Such rotations of the shaft 46 reciprocate the top section of the chain 29, and by its attachment to the carriage by link 28, the carriage is reciprocated.

For controlling the magnet 36 in timed sequence with the carriage reciprocation so that the material will be gripped only on forward movement of the carriage, a circuit involving a rail 50 is used. The rail extends along the table 12 and the carriage carries a leaf contact finger 51 which upon movement of the carriage rides upon the rail, thus completing a circuit to the magnet 36. The other terminal of the magnet circuit is grounded while the source of potential (see Figs. 8 and 10) has one terminal leading to the rail 50 and the other terminal leading to a contact 52 carried by the opposite frame 16. The frame 16 also carries a movable contact leaf 53 which is normally out of contact with 52. At the end of the rearward travel of the carriage, the contact 53 is struck by a cam operated lever 54 which is pivoted at 55 (Fig. 10). The electrical circuit is thus established and magnet energized and the material gripped. The lever 54 has its upper end rocked to the left to force the contact leaf 53 against contact 52 by a cam wheel 56 operating on its lower end. The cam wheel 56 is mounted on the shaft 41 and thus its action is synchronized with the forward travel of the carriage. When the upper end of lever 54 moves to the left to establish contact, its upper end pin 57 rides under and lifts a pivoted material gripper bar 58 pivoted to the table, thus making it temporarily inactive while the wrapping material travels. This gripper bar 58 otherwise, when not interfered with, holds the material tightly while it is being cut and keeps it in position while the carriage returns to fetch a new supply.

The cutter 67 is pivoted at 68 and has an extending end 69 which is normally pressed down by a spring 70 which thus holds the knife up. At the end of the forward movement of the carriage, which brings forward material under the bar 58 and cutter 67, the cutter is moved, the bar 58 moves down to hold the paper and a tappet 71 engages under the extension 69 and moves up to pivotally move the knife down to cut the material against the tension of spring 70. The tappet 71 is connected to a pivoted bellcrank 72, provided with a cam roller 73 which is rocked by the cam 74, keyed or otherwise fixed upon shaft 41.

*Feed of cigars and wrappers to wrapper mechanism and cigar elevation*

The wrapping material while being fed by the carriage is guided by longitudinally extending side guides 75 (see Figs. 7 and 8) and under a cross bar 76 the paper passes under guide clips 77 from the knife 67 to be received in a wrapping sheet pocket 80, from one edge of which the sheet 81 extends slightly to be moved with a cigar by suction of fingers 82. (See Figs. 22 to 26.) Under the pocket 80 the cigars are fed from a banding machine in a parallel row, a spring restrainer 83 being utilized to limit the movement from under the pocket of more than one cigar. The fingers 82 are synchronously reciprocated by a rod 84 preferably driven from the banding mechanism or from any other common power supply for the apparatus. The fingers 82 have a stepped construction including an upper surface 85 upon which the sheet rests and which is apertured in communication with a suction passage so that the fingers in reciprocation will pick up the sheet 81 and carry it forward at right angles to its path of supply from the roll and over the elevating fingers to be hereinafter described. Rearwardly of the surface 85, the fingers have a step 86 terminating in an apertured parallel surface 87 upon which the cigars are delivered. When suction is applied through the finger ducts 88, the sheet 81 as well as the end cigar is held by the suction so that upon forward movement of the fingers, they will be carried over the elevating fingers of the wrapping assembly, the sheet being moved from the pocket and resting on the cigar as in the position shown in Figs. 12 and 14. The suction is then cut off by a valve 89 and subsequently the cigar and wrapper is raised to permit the fingers to be withdrawn and commence a further cycle of operation. The valve 89 is controlled by a link 90 operated from a cam 91 of the main driving shaft 92 which shaft drives shaft 41 through the medium of sprockets 93 and chain 94 as shown in Fig. 1.

The rod 84 carries a holder 63 to which are fastened the suction fingers 82 and to which the air hose 64 is attached. This leads to the valve 89 operated by the cam 91. A lever 65 pivoted at 66 has a roller 104 operated by cam 105 and has a connection 106 attached at its upper end which carries the rod 84 slidably mounted in the main frame back and forth. See Figs. 1 and 5.

In the position shown in Figs. 12 and 14, the cigar with the wrapper thereover rests upon spaced raiser fingers 95 between which the pusher fingers 82 fit. The cigar is moved up from the step of the pusher fingers by vertical upward movement of the raiser fingers 95 which are joined by a slide 96. The slide 96 is mounted between guide brackets 97. The slide is raised and lowered by a cam 98 of the main shaft 41 (see Figs. 3, 25 and 26) upon which rides a roller 99 mounted upon a rocker arm 100, the outer end of which is connected by a link 101 to the slide 96 as at 102, a spring 103 acting to normally hold the slide and fingers down. The action of the cam lowers the fingers from the normal position, shown in Fig. 17, then to the position of Fig. 22, then raises them up again to position of Fig. 25, and then back to normal as shown in Figs. 12, 14 and 17.

Wrapping mechanism

The wrapping mechanism is located directly over the fingers 95 (see Figs. 12 to 24), a block 123 is secured on the side by means of bolts 124 and 125 (see also Figs. 1 and 2), and carries two studs 126 and 127 which support two frames 128 and 129. A plunger 121 having two upwardly extending rods 130 and 131 secured thereon is slidably mounted in frames 128 and 129 and each of the rods 130 and 131 have a coil spring 132, normally tending to keep the plunger 121 in its downward position. See Fig. 15.

At the extreme upper end of rods 130 and 131 are secured the collars 133, which limit the downward movement of the plunger 121. On the bar 121 is a bracket 134 having a stud pin 135 to which is attached the link 136, having a slot 137 which engages a pin 138 secured in the free end of the curved lever 139 which is secured to rock shaft 140, as best shown in Figs. 26 and 12. On the outer end of shaft 140 is secured an arm 141, the free end of which carries a stud pin 143 to which is connected a connecting rod 142, its lower end being pivotally connected to a cam lever 144 by the stud pin 145. The free end of the cam lever 144 carries a cam roller 146 which engages a cam 147 secured on shaft 41. The pin 138 in the free end of curve lever 139 is extended on both sides, one side carries the link 136 while the opposite end is connected with the lower end of link 148 by means of a slot 149. The upper end of link 148 is pivotedly connected to a toggle 150 by a stud pin 150'. To the toggle 150 are pivotally connected two brakes members 151 and 152 held out of engagement with the rods 130 and 131 by means of leaf spring 153. The downward movement of link 148 tends to spread the members 151 and 152 so as to exert a pressure against the rods 130 and 131 which hold the plunger 121 up against the tension of springs 132 when the plunger 121 is not supported by the link 136.

The action of cam 147 is as follows: With the plunger 121 in its normal position as shown in Fig. 20, as the cigar and wrapper are moved to the right or to the position in Fig. 16, curved arm 139 moves downward allowing the plunger 121 to be lowered. The downward movement of plunger 121 is intercepted by the cigar and the wrapper thereon, while the pin 138 carried by the curved arm 139 continues to move to its downward position. The cigar now is forced up by the raiser fingers 95. When the raiser fingers 95 reach their position as shown in Fig. 17, curved arm 139 moves still further down the pin 138 pulling down on the link 148 which spreads the members 151 and 152 locking the plunger 121 in the position shown in Fig. 15. This, together with the side pressing action of plates 181 and 185 holds the cigar while the raiser finger 95 is lowered to a position shown in Figs. 22, 23 and 24.

The folder arm 155 moves to the right, the folder arm 188 moves to the left, as shown in Fig. 24, the raiser finger 95 now returns to its upward position as shown in Fig. 18. While in this position the curved arm 139 moves upward enough to allow the brake members 151 and 152 to move away from the rods 130 and 131 so that when the raiser fingers 95 move down to their normal position, the cigar and plunger 121 will follow it by the action of springs 132. As the wrapped cigar is moved to the right, the curved arm 139 raises to its normal position, raising plunger 121 with it to position shown in Fig. 20.

Mounted in the brackets 128 and 129 is the rock shaft 154 to which are secured the folder arms 155 and 155'. (See also Figs. 27 and 28.) The lower ends carry a folder finger 156 pivoted at 157; a leaf spring 158 pressing on the upwardly extending end 159 of folder finger 156 tends to hold same in its normal position. (See Fig. 17.) The upper end of folder arm 155 carries a swivel block 160 mounted on stud 161, swivel block 160 projecting into a slot 162 of a link 163 for a purpose hereafter explained.

On the outer end of rock shaft 154 is secured an arm 164 pivoted by a stud 165 to a connecting rod 166, the end being pivotally connected by stud 167 to cam lever 168 mounted on a stud shaft 169 having a cam roller 170 which is actuated by cam 171 secured on shaft 41. (See Fig. 22.)

The action of cam 171 causes the folder arms 155 and 155' to move from its normal position shown in Fig. 12 to the position shown in Fig. 17, then to the position shown in Fig. 22 and back to its normal position (Fig. 12).

On rock shaft 154 is secured a curved arm 172 carrying a stud pin 173 which carries a link 174, the lower end of which engages the stud pin 176 of arm 175. The arm 175 pivoted at 175' in a bracket 175'' is secured to block 123. The arm 175 has an upward and downward extending portion carrying two studs 177 and 178. The stud 177 carries a link 179 which is connected by means of a stud pin 180 to a plate 181 pivoted at 182 at the top of frames 128 and 129, while the stud 178 carries the link 183 connected by stud 184 to a plate 185 pivoted at 186 at the top of frames 128 and 129. The rocking of arm 175 causes the plates 181 and 185 to move toward and away from each other, thereby pressing wrapper against sides of cigar.

The rocking of arm 175 is brought about as follows: As the folder arms 155 and 155' secured on rock shaft 154 move to the extreme left, as shown in Fig. 12, by the highest point of cam 171, curved arm 172 moves the link 174 up, pulling up on arm 175. Link 179 moves the plate 181 to the left and plate 185 to the right. The plates 181 and 185 are now open to receive a cigar as it moves upward, with the wrapping material above it. As the cigar and wrapper enter the space between the plates 181 and 185, cam 171 is so shaped as to allow the plates 181 and 185 to move toward each other and rest against the side of the cigar with the aid of spring 181'. (See Fig. 15.) The moving of the folder arms 155 and 155' to the extreme right as shown in Fig. 22 will hereinafter be explained. Mounted on frames 128 and 129 is a rock shaft 187 on which is secured the folder arms 188 and 188', the lower ends carrying a folder finger 189 pivoted at 190. The upper end of the folder arm 188 carries a stud 191 which carries the link 163 having a slot 162 which acts on the swivel block 160. The other end of link 163 is pivotally connected by a stud 192 to the end of bell crank 193; to the free end of bell crank 193 is pivotally connected a connecting rod 195 by means of a stud 194. The lower end of connecting rod 195 is pivotally connected to a cam lever 196 by a stud 197. Cam lever 196 is mounted on the stud shaft 169 and carries a cam roller 198 which is actuated by cam 199 secured on shaft 41. (See Fig. 24.) The shape of cam 199 causes folder arms 188 and 188' to move from their normal position shown in Fig. 24 and back to normal position shown in Fig. 17.

*Tucking and closing*

With the cigar in position shown in Fig. 24, that is, with the wrapper folded around the cigar, on each end of plates 181 and 185 at the lower end is pivoted a movable member 212 (see Figs. 26, 27 and 28), pivoted at 213 by a pivot 214. The movable members are so shaped as to conform with the end of the cigar. They are kept in their open position by springs 215 secured to plates 181 and 185, and are moved toward each other, tucking in the sides of the wrapper by means of members 216 secured in the upper ends of segment levers 217 which extend upward through table 10.

The segment levers 217 are pivoted on studs 218 on table 10 (see Figs. 1 and 10) and are caused to move toward each other by means of a spring 219 and kept in their normal position against the action of spring 219 by means of a downward extending arm 220 (see Fig. 25) which is engaged by pins 221 shown in Figs. 1, 25, 26, 32 and 10. Cam levers 222, pivoted on stud shaft 169 and having cam rollers 223 operated by cams 224, control the two downwardly extending members 220, as shown in Figs. 10 and 26.

Figure 2:
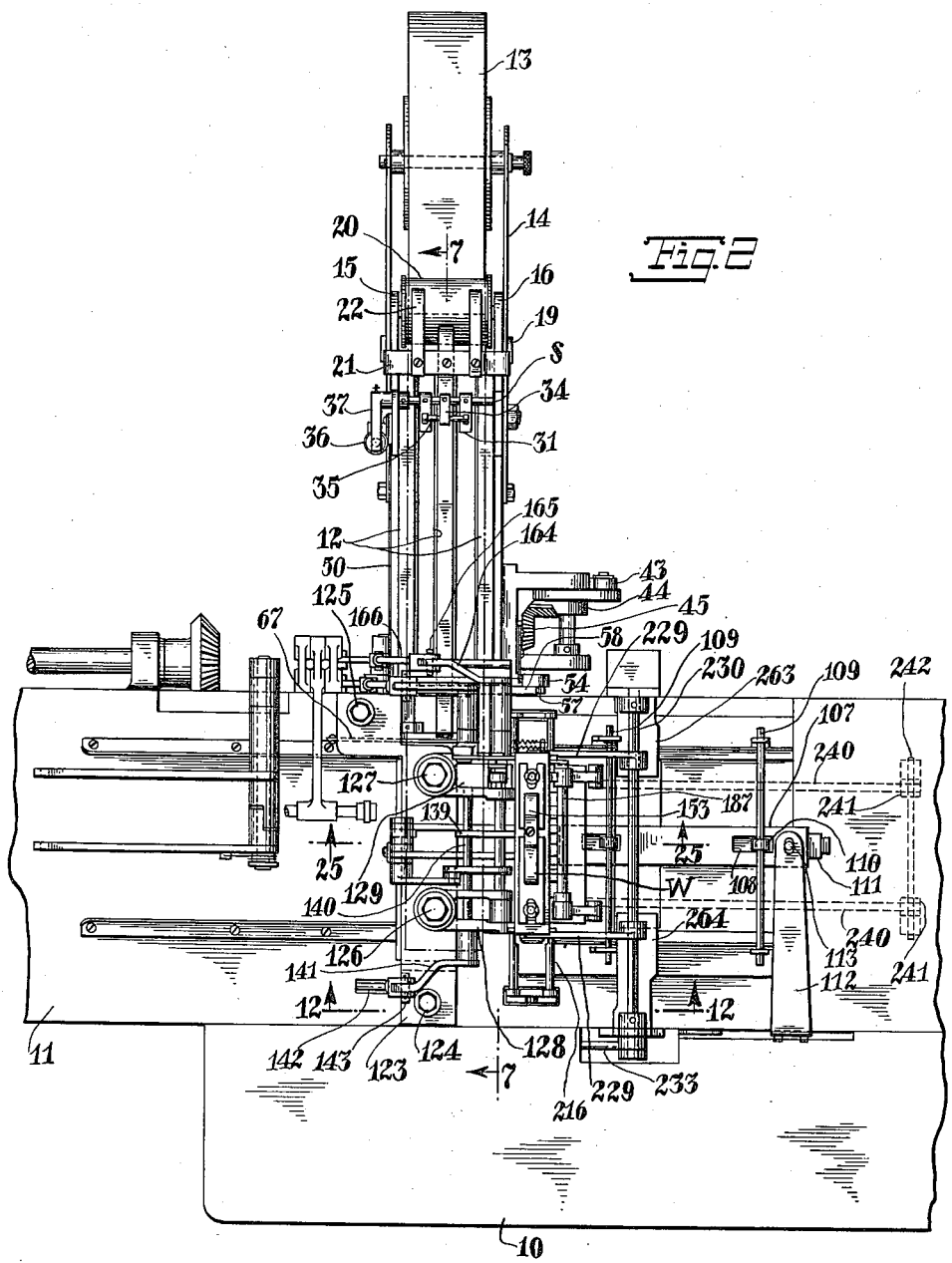
Fig. 2 is a top plan view of the invention alone.
Figure 3:
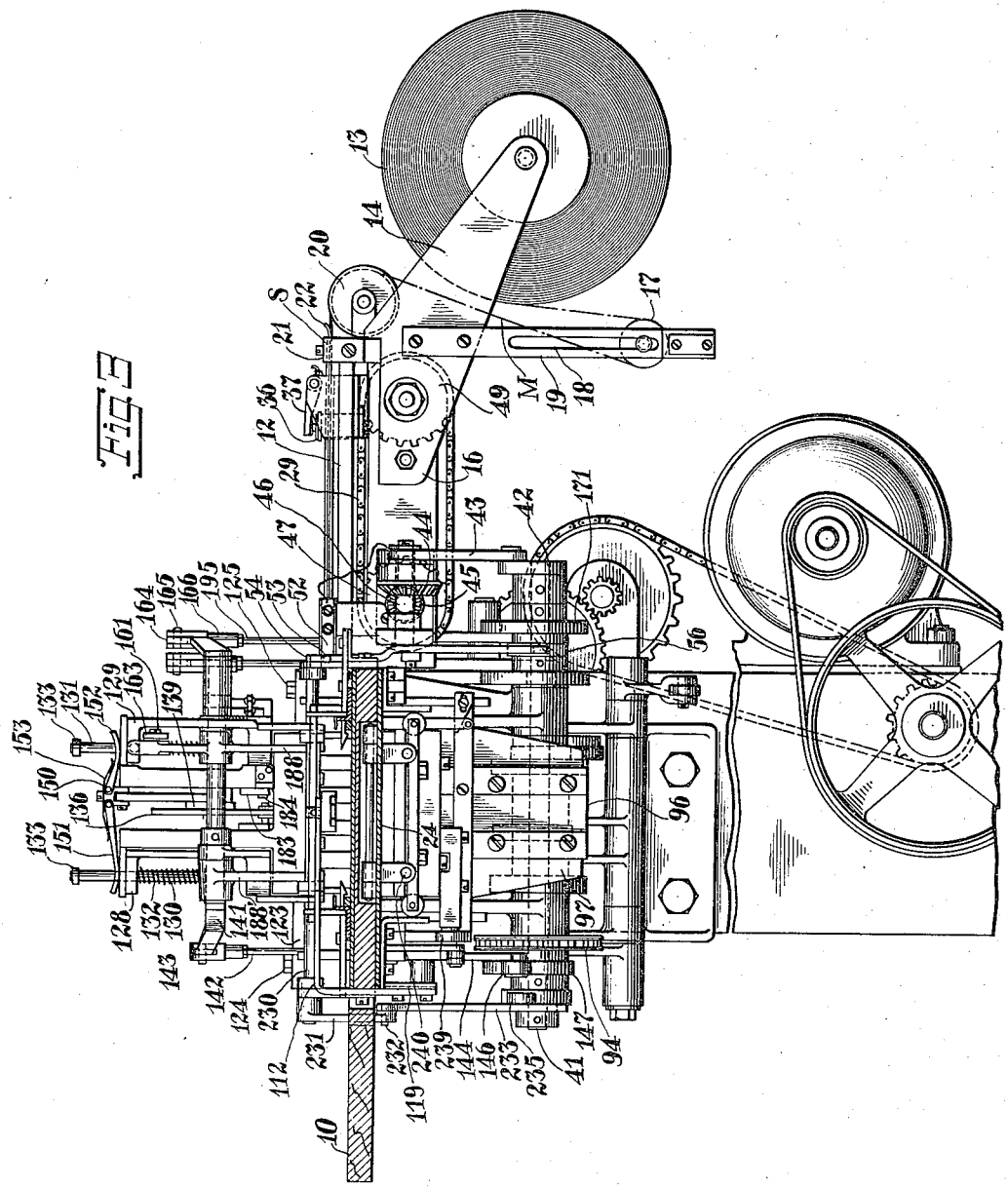
Fig. 3 is an end elevation.
Figure 4:
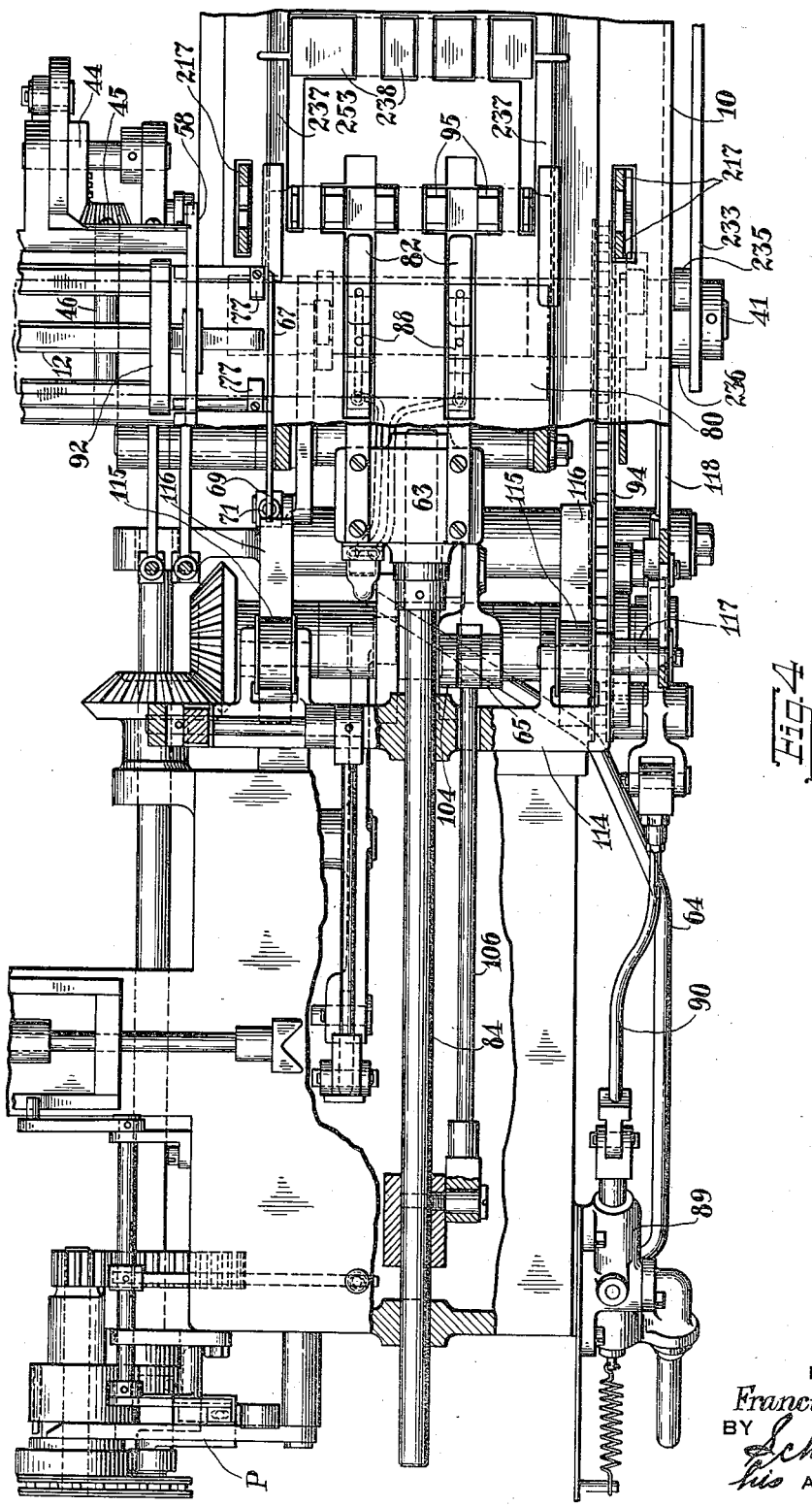
Fig. 4 is a section taken on line 4 of Fig. 1.
Figure 5:
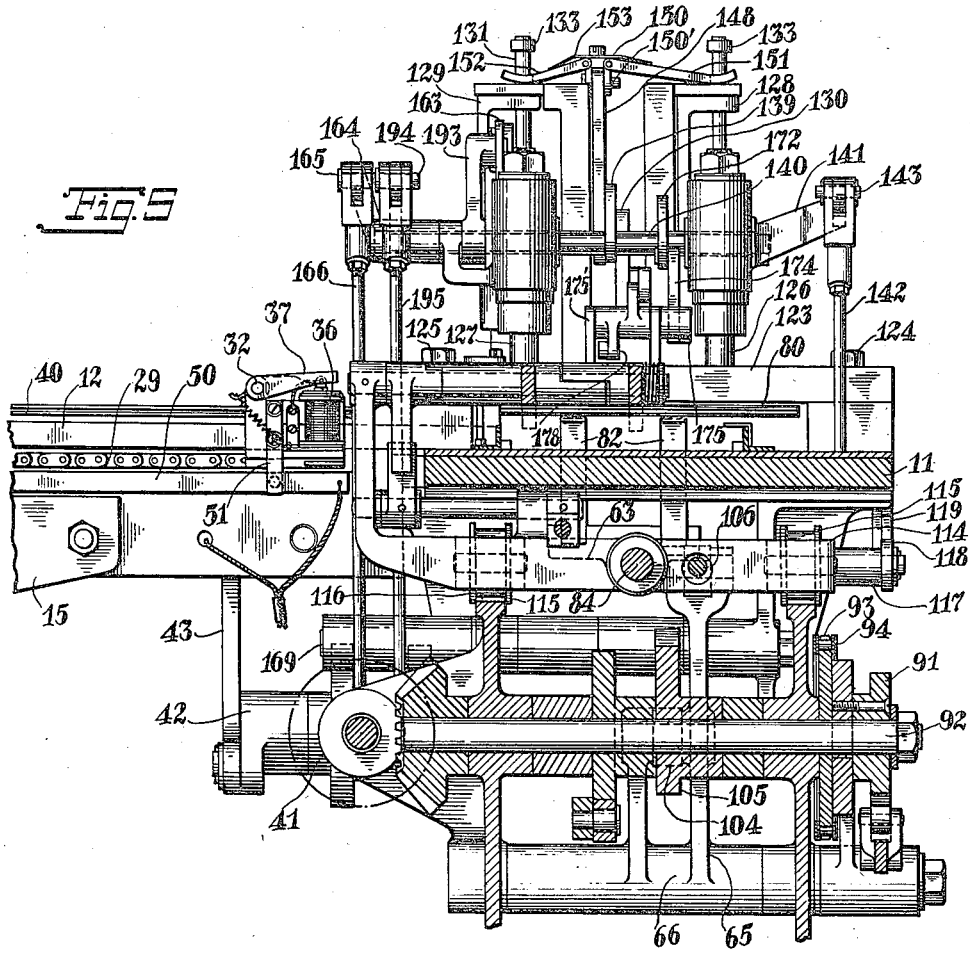
Fig. 5 is a section taken on line 5 of Fig. 1.
Figure 6:
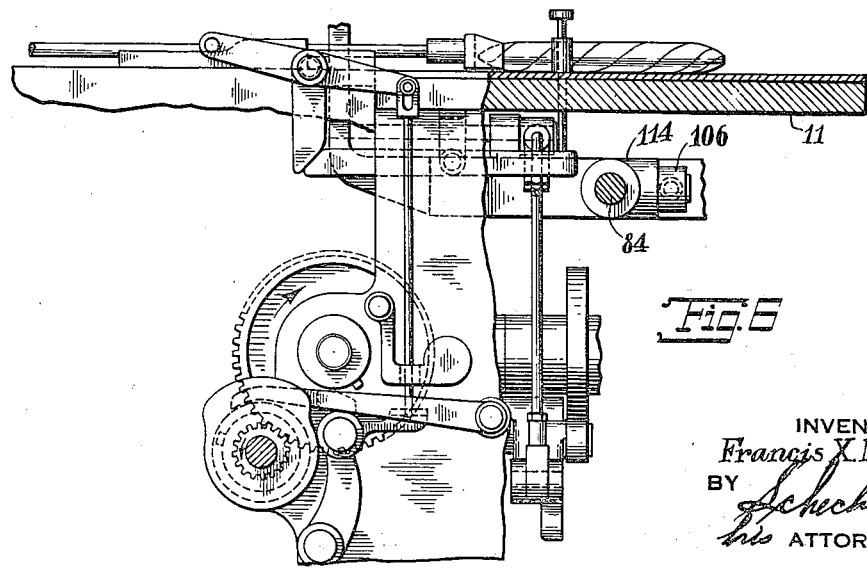
Fig. 6 is a section taken on line 6 of Fig. 1.

Secured at each end of the raiser fingers 95 are two blades 225, each having a curved flat spring 226 secured by screws 227 having curved upper ends 228 curved away from the blades 225 (see Figs. 26 and 30), while two downwardly moving members 229 are secured to rock shaft 230 (see Figs. 1 and 2). On the outer end of rock shaft 230 is a downwardly extending arm 231 pivotally connected by a stud 232 to a link 233 having a slotted end 234 straddling cam shaft 41, said link having a cam roller 235 actuated by cam 236.

The action of the above is as follows: The movable members 212 are in their normal or open position. They are moved toward each other tucking in the sides of the wrapper. The raiser fingers 95 carrying the blades 225 and the curve springs 226 now move upward (see Figs. 26 and 29). While in this position the downward moving arms 229 move downward carrying the upper surface of the wrapper together with the lower surface down between the blade 225 and spring 226 (see Fig. 30) and forcing the ends all of the way down as shown in Fig. 26. As the downward moving members 229 move down by the action of cam 236, the cams 224 operating the movable side tucking members 212 allow these members to return to their normal or open position or away from the cigar. The elevating means, together with the cigar and plunger 121 move down so as to have the cigar rest on table 10 with the ends of the wrapper extending downward between the blades 225 and the spring 226 which is now in the path of the moving member 82. This now moves to the right bringing the wrapped cigar toward the heat applying means, the member 82 at the same time carrying a cigar and a wrapper to the wrapping position as shown in Figs. 12 and 31. As the wrapped cigar with the tucked and folded ends extending downward are moved to the right, the downward extending ends are kept in this position by the guide strips 237 (see Figs. 27 and 31) and as the next cigar is wrapped in the same manner it forces the previous wrapped cigar to a point over a heated member 238 which is in its lowered position as the cigar passes over it (see Fig. 38). The heated member 238 is mounted on the ends of rod 240 which terminate in arms 241 pivoted at 242 on the extension 243. The heated member 238 carries a cam roller 239 which engages a member 244 pivoted at 245 on a stud 246. (See Fig. 39.) Pivoted to the member 244 by a stud pin 247 is a connecting rod 248 pivoted at 249 to a cam lever 250 actuated by a cam 251 secured on shaft 92. (See Fig. 39.)

The heating member 238 is electrically heated by heating units 252 attached thereto. The upper surface of heating unit 238 is shaped so as to conform with the shape of the cigar and being cut away so as to allow it to come up through openings 253 in table 12 (see Figs. 35 and 34). Mounted on pivots 254 and 255 are tucking arms 256 and 257. The lower ends of same carry pins 258 and 159 which are engaged by members 260 and 261 carried on a bar 262 secured to slide 96. Over table 12 and in a position over the cigar about to receive an application of heat, are the downwardly moving clamp members 263 and 264, 263 being pivoted at 265 and held in its upward position by a spring 266, a bolt 267 having a collar 268 acted on by an arm 269 secured to shaft 270. The clamp 264 pivoted at 271 and held in its upper position by a spring 272, a bolt 273 having a collar 274 at its lower end is engaged by an arm 275 secured to the rock shaft 270. To the rock shaft 270 is fixedly attached a downwardly extending arm 276 carrying a pin 277 engaging a slotted link 278 pivoted at 279 to member 244 (see Fig. 39).

The operation is as follows: As the cigars are forced to the right in a position over the heated member 238 with the folded ends extending downward and held in this position by the guide strips 237, the elevating means is raised to carry a cigar to operating position in the wrapping mechanism. The raising of the slide 96 raises the strip 262 causing the arms 256 and 257 to move toward each other by the action or tension of a spring as shown (see Fig. 40) bringing the downwardly extending ends of the wrapped cigar in and against the underside of the cigar while the heating member 238 now moves upward by the action of the cam 251, the clamp members 263 and 264 being moved downward to exert a pressure on the cigars and against the heated member 238. The heated member 238 moves down, the clamping members 263 and 264 move up, the next wrapped cigar moving to the right carrying the heat-sealed wrapper cigar away from the heated member as it moves to the right.

To insure the cigars lying flat when they pass over the heating unit, a bar 107 is placed in the center. See Figs. 25, 34, 35 and 38. The bar 107 is held in place at the slotted portions 108 by means of the cross rods 109 holding in place portions 110 which are fastened to a slide 111. As shown on Fig. 25, this bar 107 moves with the advance of the cigars and keeps an even pressure at the central portion to facilitate the heat creasing of a cigar wrapper. A plate 112 with the pin 113 pulls the bar 107 on an even pace with the forward travel of cigars. See Fig. 2. This is accomplished as follows: The cam 105 which advances the pusher rod 84 with the suction fingers 82 attached also carries a carriage 114 mounted on the wheels 115 on a track 116. See Fig. 5. A pin 117 engages the slotted portion of the bar 118 which pushes it, being itself slidably mounted on the frame 10 at the point 119 and secured at its other end to the plate 112, thus, advancing and drawing back the bar 107 at the required time. See Figs. 1 and 5.

*Coordinate operation*

Coordinate operation of all parts is insured by the derivation of all power from a single source; in the present instance that source being represented as the driving mechanism of an associated banding machine. The material feed is powered through the chain 29 which is oscillated by crank 42 of the shaft 41, which in turn operates through its various cams the folding and tucking mechanism of the wrapper per se.

As shown more clearly in Fig. 1, the shaft 41 derives its power from the banding machine shaft 92 through sprockets 93 and chain 94. In this way there is accomplished not only a complete automatic coordination of material feed, cigar feed and wrapper mechanism movement, but in addition thereto the actuation is coordinated with that of the banding machine in such manner that the apparatus may partake of numerous automatic controls and safety features which normally form a part of the banding apparatus.

In view of the step by step specification of the structural elements of the invention, it is not believed that a detailed discussion of the coordinate operation of the various parts is required. It will be understood that in the operation of the device material is fed from the material roll in periodic stages by the reciprocation of the carriage. The cutter is coordinately actuated to supply properly sized wrapper sheets to the wrapper pocket under which the cigar passes. The pneumatic suction ducts through the pusher fingers act to jointly carry one cigar and one sheet to the wrapping mechanism where the cigar is elevated into a frame which forces the wrapper to be folded about the cigar. Longitudinally moving fingers then pass under the cigar to fold the underside of the wrapper therearound and the tucking, end-folding and sealing is then accomplished through the actuation of the respective members in timed sequence through the characteristics of the various cams of shaft 41.

In accordance with the provisions of the patent statutes, I have described my invention, but I desire it understood that it is not confined to the particular form shown and described, the same being merely illustrative, and that the invention can be carried out in other ways without departing from the spirit of my invention, and therefore I claim broadly the right to employ all equivalent instrumentalities coming within the scope of the appended claims, and by means of which objects of my invention are attained and new results accomplished; as it is obvious that the particular embodiments herein shown and described are only some of many that can be employed to attain these objects and accomplish these results.

Having now described my invention, what I claim as new, and desire to secure by Letters Patent, is:

1. In an article wrapping mechanism, a wrapping assembly, and an article supply means therefor, comprising a pair of reciprocating fingers adapted to receive an article thereon and move it under the wrapping mechanism, said fingers including suction ports adapted to apply suction to the article for retaining it upon the fingers.

2. In an article wrapping mechanism, a wrapping assembly, and an article supply means therefor, comprising a pair of reciprocating fingers adapted to receive an article thereon and move it under the wrapping mechanism, said fingers including suction ports adapted to apply suction to the articles for retaining it upon the fingers and automatic means for periodically controlling the suction to release the article at the end of its movement.

3. In an article wrapping mechanism, a wrapping assembly, and an article supply means therefor, comprising a pair of reciprocating fingers adapted to receive an article thereon and move it under the wrapping mechanism, said means being operable to move a wrapping sheet with the article and comprising ported fingers adapted to move a sheet through its adherence to the fingers by suction.

4. In an article wrapping mechanism, a wrapping assembly, and an article supply means therefor, comprising a pair of reciprocating fingers adapted to receive an article thereon and move it under the wrapping mechanism, said means being operable to move a wrapping sheet with the article and comprising ported fingers adapted to move a sheet through its adherence to the fingers by suction, said fingers also including suction means for retaining an article therewith under the sheet.

5. In a cigar wrapping machine, feeding means for a continuous supply of cigars, means for periodically supplying sheets of wrapping material over said continuous supply of cigars and a single means for moving one cigar and one sheet of material to an associated wrapping assembly, said means comprising carrier fingers having a stepped surface to receive and convey the cigar and the band over it at their respective levels to the wrapping assembly.

6. In a cigar wrapping machine, feeding means for a continuous supply of cigars, means for periodically supplying sheets of wrapping material over said continuous supply of cigars and a single means for moving one cigar and one sheet of material to an associated wrapping assembly, said means comprising carrier fingers having a stepped surface to receive and transport the cigar and the band over it at their respective levels and having suction ports to apply suction to said sheet and cigar for retaining them with said fingers for a predetermined distance of travel.

7. In a cigar wrapping machine, feeding means for a continuous supply of cigars, means for periodically supplying sheets of wrapping material over said continuous supply of cigars and a single means for moving one cigar and one sheet of material to an associated wrapping assembly, said means comprising carrier fingers having a stepped surface to receive and transport the cigar and the band over it at their respective levels and having suction ports to apply suction to said sheet and cigar for retaining them with said fingers for a predetermined distance of travel and coordinately actuated control means for the application of suction to said fingers.

8. In a cigar wrapping machine, the combination with pneumatically operative means for simultaneously moving a cigar and associated wrapper of a cigar and a stationary wrapper receiving assembly, of means for forcing the cigar into the assembly whereby the sides thereof will have the wrapper folded thereagainst, and means for folding the edges of the wrapper against the bottom of the cigar while it is held stationary in the receiving means.

9. In a cigar wrapping machine, the combination with pneumatically operative means for simultaneously moving a cigar and associated wrapper of a cigar and a stationary wrapper receiving assembly, of means for forcing the cigar into the assembly whereby the sides thereof will have the wrapper folded thereagainst, means for folding the edges of the wrapper against the bottom of the cigar while it is held stationary in the receiving means, and means forming a joint constructive part of said pneumatically operative means for ejecting the cigar from the receiver after the folding operation.

10. The combination with a cigar wrapping machine comprising cigar and wrapper supplying means and a stationary cigar wrapping mechanism; of a cigar and wrapper conveyor, said conveyor being adapted to receive and hold a cigar, suction means on said conveyor for holding a wrapper positioned above the cigar in a predetermined position relative to the cigar and the stationary wrapping mechanism, and means for reciprocating said conveyor from the cigar and wrapper supplying means to a position beneath the wrapping mechanism.

11. The combination with a cigar wrapping machine comprising cigar and wrapper supplying means and a stationary cigar wrapping mechanism; of a cigar and wrapper conveyor, said conveyor being adapted to receive and hold a cigar, suction means on said conveyor for holding a wrapper positioned above the cigar in a predetermined position relative to the cigar and the stationary wrapping mechanism, suction means for holding the cigar on the conveyor in the same axial and edgewise disposition, and means for reciprocating said conveyor from the cigar and wrapper supplying means to a position beneath the wrapping mechanism.

12. The combination with a cigar wrapping machine, comprising cigar and wrapper supplying means and a stationary cigar wrapping mechanism; of a cigar and wrapper conveyor, controllable intermittent suction means on said conveyor to receive and temporarily hold a wrapper and a cigar in predetermined position relative to each other and to the stationary wrapping mechanism, a cigar elevating plunger for removing both cigar and wrapper from said conveyor into the wrapping mechanism while the suction means are synchronously made inoperative, and means for reciprocating said conveyor from the wrapping mechanism to the cigar and wrapper supplying means.

13. The combination with a cigar wrapping machine, comprising cigar and wrapper supplying means and a single cigar wrapping station; of a cigar and wrapper conveyor, suction means on said conveyor for holding a cigar with a superimposed wrapper in proper relation to each other, a valve for automatically controlling the suction, means for reciprocating said conveyor between the cigar and wrapper supplying means and the cigar wrapping station and for simultaneously removing the cigar and wrapper from said conveyor and into operative wrapping position in said station.

14. In a cigar wrapping machine, cigar and wrapper supplying means, a reciprocating conveyor, adapted to transport a cigar with a superimposed wrapper simultaneously from the cigar and wrapper supplying means to a wrapping station, means for elevating said cigar and wrapper from the conveyor into a stationary position, means for completing the wrapping and enveloping of the cigar while the latter remains in said stationary position, a separate heat-sealing and pressing mechanism, adapted to seal the wrapper in its finished form and means to transfer the wrapped cigar from the stationary wrapping position to the heat-sealing and pressing mechanism.

15. In a cigar wrapping machine, means for elevating a cigar and simultaneously therewith folding a wrapping sheet against its sides and means, consecutively operable, while the cigar is held stationary throughout the remaining wrapping manipulations, to completely envelop the cigar by folding the lateral and the end edges of the wrapper underneath the cigar.

16. In a cigar wrapping machine, means for elevating a cigar and simultaneously therewith folding a wrapping sheet against its sides, means, consecutively operable, while the cigar is held stationary throughout the remaining wrapping manipulations, to completely envelop the cigar by folding the lateral and the end edges of the wrapper underneath the cigar, and conveying means for the article and the wrapper sheet, operable after folding, to move the wrapped article to an end-sealing mechanism.

17. In a cigar wrapping machine, means for elevating a cigar and simultaneously therewith folding a wrapping sheet against its sides, means, consecutively operable, while the cigar is held stationary throughout the remaining wrapping manipulations, to completely envelop the cigar by folding the lateral and the end edges of the wrapper underneath the cigar, conveying means for the article and the wrapper sheet, operable after folding, to move the wrapped article to an end-sealing mechanism, and auxiliary means to prevent spontaneous unwrapping of the article in operating transit.

18. In a cigar wrapping machine the combination with a cigar-elevating plunger, adapted to lift a cigar into a stationary wrapping position; of a resilient blade, fixedly attached to said plunger and an independent blade, adapted to cooperate with said resilient blade when the latter is lifted together with the cigar, and thereby to crease and to fold the end of the wrapping material projecting beyond the cigar ends through a shear-like action.

19. In a cigar wrapping and sealing machine, adapted to use wrapping material which is partly resilient and provided with a fusible coating, the combination with heat-sealing means; of a reciprocating plunger, provided with a heated mold, conforming to the shape of the cigar from end to end in a wrapped and folded condition, and a tucking arm, operatively connected with the plunger and adapted to rebend the folded wrapper end toward the body of the cigar and means to activate said tucking arm synchronously with the application of the heated mold to the cigar wrapper.

20. In a cigar wrapping machine, means for applying a wrapper of resilient material, provided with a fusible coating to the top of a cigar, means for elevating said cigar into a stationary wrapping position while simultaneously curving the wrapper, saddle-like, around said cigar, means for overlapping the dependent edges of the cigar across the underside of the cigar, means for contracting and bellow-folding the projecting ends of the wrapper, and cooperating means for creasing and bending the contracted ends downwardly, all the aforesaid overlapping, bellow-folding, creasing and bending operations to be performed while the cigar is held in said stationary wrapping position, independent means for delivering the cigar to an end-sealing position, means for rebending and folding the creased ends of the wrapper back against the body of the cigar and means to apply a heated mold, conforming to the cigar ends, to the wrapper so that the rebent ends are sealed in partly fused condition against the wrapper.

FRANCIS X. MALOCSAY.